Oct. 10, 1944. R. J. WOLF ET AL 2,359,816
WATER HEATER
Filed Nov. 18, 1942

Inventors
Richard J. Wolf
John G. Dunville
By
Attorneys

Patented Oct. 10, 1944

2,359,816

UNITED STATES PATENT OFFICE 2,359,816

WATER HEATER

Richard J. Wolf and John G. Dunville, Chicago, Ill., assignors to Sears, Roebuck and Co., Chicago, Ill., a corporation of New York Application November 18, 1942, Serial No. 466,086

10 Claims. (Cl. 122—367)

This invention relates to heat exchange devices and particularly to apparatus of this class adapted for heating water, as for domestic purposes.

One object of the invention is to provide a new and improved heat exchange apparatus for the purpose indicated.

Another object of the invention is to provide a water heater so designed as to be simple and inexpensive to manufacture and well adapted to be made of cast iron instead of employing brass or copper tubing.

A further object of the invention is to provide a water heater including a burner serving as the heat source and provided with means to control the flow of products of combustion in a manner tending to secure the efficient transfer of heat therefrom.

More specifically it is an object of the invention to provide a heat exchange device in combination with a heat source and to furnish the heat exchange device with fins extending in a direction of flow of hot gases from the heat source together with baffles arranged at intervals to insure contact of the gases with said fins.

Other objects and advantages of the invention will appear from the following description taken in conjunction with the drawing in which.

Figure 1:
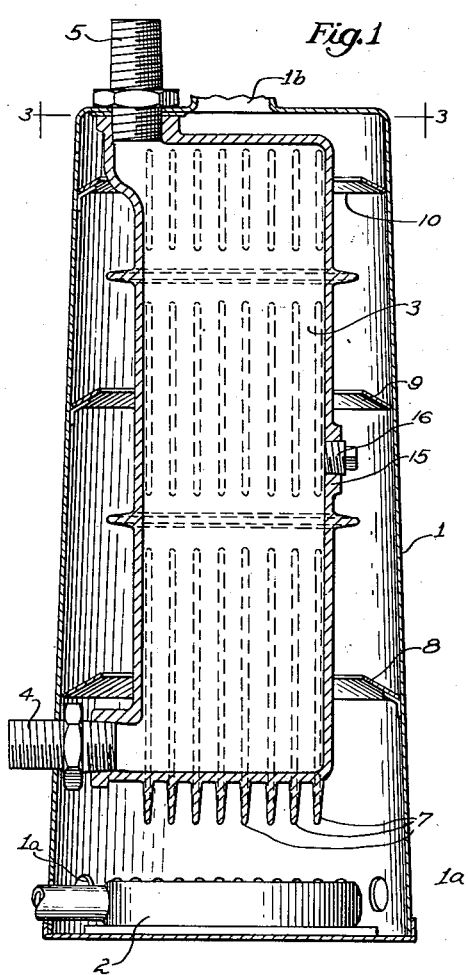
Fig. 1 is a vertical sectional view showing a water heater embodying this invention, the section being taken substantially as indicated at line 1—1 on Fig. 3.

While there is shown and described herein certain specific structure embodying the invention, it will be manifest to those skilled in the art that various modifications and rearrangements of the parts may be made without departing from the spirit and scope of the invention, and that the same is not limited to the particular forms herein disclosed, except insofar as indicated by the appended claims.

As shown in the drawing the water heater embodying this invention includes a slightly tapered tubular casing 1 which may be understood as the inner wall of a housing, such housing including suitable heat insulating material and an outer shell or sheath not shown. Mounted at one end of the casing 1, which is the lower end in the arrangement illustrated, there is provided a heat source in the form of a gas burner 2 and the casing 1 also includes suitable air inlet openings 1a and a flue at 1b for the escape of products of combustion.

Figures 3, 4:
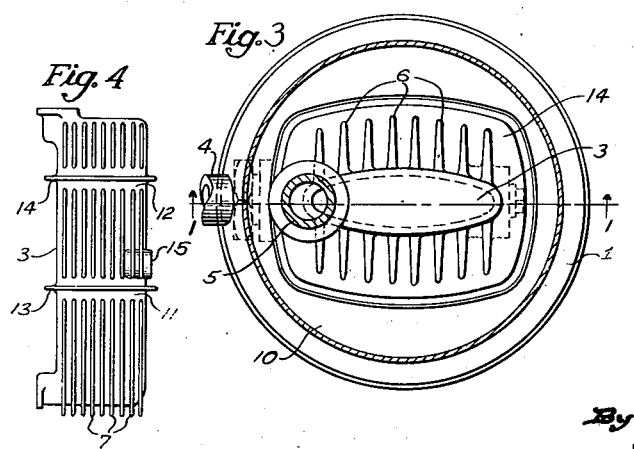
Fig. 3 is a transverse or horizontal section taken as indicated at line 3—3 on Fig. 1.
Fig. 4 is a front elevation of the heat exchange unit shown in Fig. 1, but on a much smaller scale, and showing the unit removed from the outer casing.

Within the casing 1 the heat exchange unit consists of a chamber 3 formed preferably as a casting of gray iron or like material and including a water inlet at its lower end connected to an inlet pipe 4 and a water outlet at its upper end provided with an outlet pipe 5. In the structures shown the inlet enters horizontally at the lowest point of the chamber 3 while the outlet extends vertically from its top wall. Externally the hollow body or chamber member 3 is provided with integral longitudinally extending fins 6 which are conveniently formed in parallel planes so as to project laterally from two opposite sides of the body 3. These fins extending vertically within the casing 1 provide a series of deep channels serving as passages for the upward flow of products of combustion from the burner 2 to facilitate the exchange of heat from these hot gases to the water within the chamber 3. As seen from Fig. 3 the water space in the chamber 3 is elongated in horizontal cross-section with its longer dimension extending transversely of the planes of the fins 6 so that the walls from which these fins project externally are separated by the shorter dimension of the space thus bringing all the water in the chamber 3 into comparative proximity to the walls from which the heat is to be absorbed. Furthermore the fins 6 are quite deep in proportion to the cross-sectional width of the chamber 3 so as to present large areas to the hot gases to insure the rapid transfer of heat therefrom to the water.

It may be understood that a heat exchange unit of this general character might be mounted with the fins extending horizontally in a heating chamber arranged for the travel of the hot gases in horizontal direction, but that the vertical arrangement shown in the drawing is preferred for most purposes. With this arrangement the fins 6 disposed at two opposite sides of the chamber 3 are connected by integral horizontal portions 7 extending across the bottom wall of the unit 3 and directly above the burner 2.

With the arrangement shown it may be understood that the relatively cold water is introduced into the chamber 3 from the inlet 4 at its lower end while the heated water is drawn off through the pipe 5 at the upper end. It has been found that the flame and hot gases coming into contact with the walls and fins of the chamber 3 tend to veer away from the surfaces which are thus cooled by contact with the cold water. However, it is desirable to hold the gases in contact with the fins 6 and for this purpose an annular baffle 8 is disposed in the casing 1 extending inwardly from the casing wall toward the hollow body 3 and its fins 6.

The baffle 8 is inclined upwardly and inwardly toward the chamber 3 and its fins 6 leaving only a relatively restricted clearance space around the fins and thus forcing the hot gases to pass between them in their upward flow. A second baffle 9 similar to the baffle 8 is spaced at a distance upwardly from the first baffle and a third baffle 10 is similarly located near the uppermost portion of the chamber 3.

Figure 2:
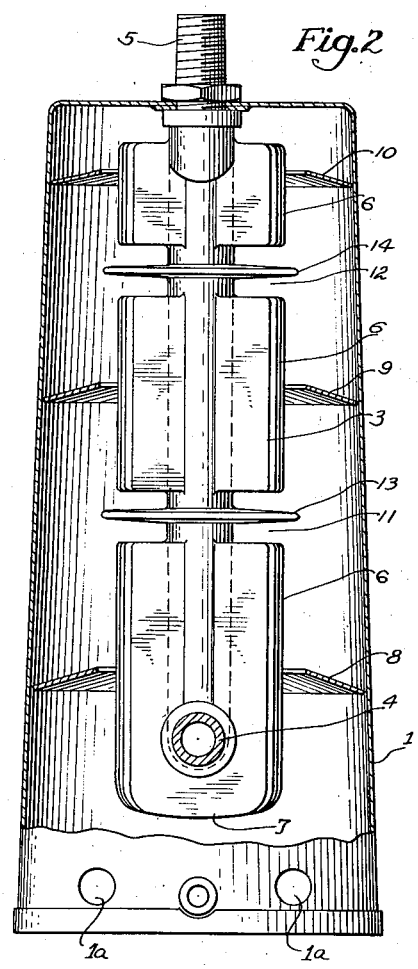
Fig. 2 is an elevation taken partly in section through the casing at a plane perpendicular to that of Fig. 1, but showing the heat exchange unit in side elevation.

To supplement the action of the baffles 8, 9 and 10 in holding the hot gases close to the fins 6 and in the spaces between them the fins are interrupted as seen at 11 in Fig. 2 and also at 12 in said figure leaving spaces having greater cross-section than the spaces which are provided for the gases between the fins 6. For this reason the gases emerging from the vertical spaces between the fins into the spaces 11 or 12 tend to expand laterally with consequent reduction in the velocity of their upward flow. The sudden change in volume of the flow passage as between the narrow passages between the fins 6 and the open spaces 11 and 12 also results in diminished pressure in these spaces 11 and 12 which tends to draw the gases inwardly from the surrounding space within the casing and thus tends to hold them closer to the fins 6 than in a structure having continuous vertical fins.

If desired the low pressure spaces 11 and 12 may be provided with transverse fins or ribs 13 and 14 respectively formed integrally with the body of the chamber 3 so as to absorb additional heat from the hot gases without seriously impairing the effect of the spaces 11 and 12 in holding the flow of gases close to the fins 6.

Figure 5:
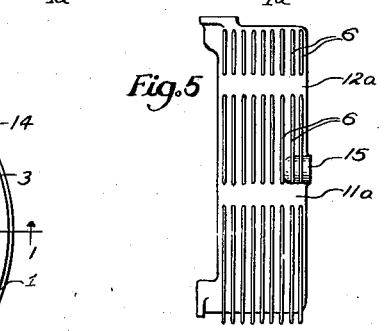
Fig. 5 is a front elevation of a heat exchange unit similar to that shown in Fig. 4, but involving a slightly modified construction.

Thus with the baffles 8, 9 and 10 deflecting the gases inwardly at intervals in their upward flow and with the spaces 11 and 12 disposed intermediate the baffles and drawing the gases inwardly in their upward travel a highly efficient thermal contact between the gases and the heat absorbing surfaces of the body 3 is maintained throughout the unit. Fig. 5 illustrates a structure which is similar to that already described except that the transverse ribs 13 and 14 are omitted leaving the spaces 11ª and 12ª clear of obstruction between the ends of the interrupted fins 6. With either type of construction since the hollow body 3 is formed as a casting it is preferably provided with a boss 15 disposed at about the mid-point of its length and having an aperture to facilitate removal of the core sand from the casting. This opening is then threaded and closed with a plug 16.

We claim:

1. In a water heater, a hollow body provided with a water inlet at one end and a water outlet at the other end, said body having external heat absorbing fins extending longitudinally and forming channels for the flow of hot gases, said fins being interrupted intermediate their ends to form a low pressure space in which the flow of gases is retarded, and a housing enclosing said body, together with baffles at intervals extending inwardly from the housing wall toward the fins, said baffles being spaced apart longitudinally of the fins with said low pressure space disposed intermediate the baffles.

2. In a water heater, a hollow body provided with a water inlet at one end and a water outlet at the other end, said body having external heat absorbing fins extending longitudinally and forming channels for the flow of hot gases, said fins being interrupted at intervals intermediate their ends forming low pressure spaces for retarding the flow of gases, a housing enclosing said body and baffles at intervals extending inwardly from the housing wall at positions intermediate said low pressure spaces for deflecting the gases toward the fins and along the channels.

3. In a water heater, a hollow body provided with a water inlet at one end and a water outlet at the other end, said body having external heat absorbing fins extending longitudinally and forming channels for the flow of hot gases, a housing enclosing said body with baffles at intervals extending inwardly from the housing wall and transverse ribs formed on the body at longitudinally separated positions intermediate said baffles in planes intersecting the planes of said fins.

4. In a water heater, a hollow body provided with a water inlet at one end and a water outlet at the other end, said body having external heat absorbing fins extending longitudinally and forming channels for the flow of hot gases, a housing enclosing said body, said fins being interrupted at intervals intermediate their ends forming low pressure spaces in which the flow of gases is retarded, baffles at intervals extending inwardly from the housing wall at positions intermediate the location of said spaces and transverse ribs on the body disposed in said spaces in planes intersecting the planes of the fins.

5. In a water heater, a hollow body provided with a water inlet at the lower end and a water outlet at the upper end, a housing enclosing said body, a burner in the housing below the lower end of said hollow body, said body having external fins extending vertically and forming channels for the flow of hot gases from the burner, said housing being spaced laterally from said body and its fins, and transversely disposed baffles extending inwardly from the housing wall at intervals to deflect the upwardly flowing gases into said channels, said fins being interrupted intermediate their ends forming a low pressure space in which the flow of gases is retarded.

6. In a water heater, a hollow body provided with a water inlet at the lower end and a water outlet at the upper end, a housing enclosing said body, a burner in the housing below the lower end of said hollow body, said body having external fins extending vertically and forming channels for the flow of hot gases from the burner, said housing being spaced laterally from said body and its fins, and transversely disposed baffles extending inwardly from the housing wall at intervals to deflect the upwardly flowing gases into said channels, said fins being disposed in parallel vertical planes and being interrupted at intervals intermediate their ends forming low pressure spaces, said baffles being spaced vertically from said spaces.

7. In a water heater, a hollow body provided with a water inlet at the lower end and a water outlet at the upper end, a housing enclosing said body, a burner in the housing below the lower end of said hollow body, said body having external fins extending vertically and forming channels for the flow of hot gases from the burner, said housing being spaced laterally from said body and its fins, and transversely disposed baffles extending inwardly from the housing wall at intervals to deflect the upwardly flowing gases into said channels, said fins being interrupted intermediate their ends forming a low pressure space and the body including a transverse rib in said space with the adjacent groups of fins terminating at opposite sides of said rib and in spaced relation thereto.

8. In a water heater, a hollow body provided with a water inlet at one end and a water outlet at the other end, said body having external heat absorbing fins extending longitudinally and forming channels for the flow of hot gases, and a housing enclosing said body, said fins being disposed in longitudinally separated groups with a low pressure space extending transversely of the fins between adjacent groups and a transverse rib on the body disposed in said low pressure space in a plane intersecting the planes of the fins.

9. In a water heater, a hollow body provided with a water inlet at one end and a water outlet at the other end, said body having external heat absorbing fins extending longitudinally and forming channels for the flow of hot gases, a housing enclosing said body, said fins being interrupted at intervals intermediate their ends forming low pressure spaces in which the flow of gases is retarded, and transverse ribs on the body disposed in said spaces in planes intersecting the planes of the fins.

10. In a water heater, a hollow body provided with a water inlet at the lower end and a water outlet at the upper end, a housing enclosing said body, a burner in the housing below the lower end of said hollow body, said body having external fins extending vertically and forming channels for the flow of hot gases from the burner, said fins being interrupted intermediate their ends forming a low pressure space and the body including a transverse rib in said space with the adjacent groups of fins terminating at opposite sides of said rib and in spaced relation thereto.

RICHARD J. WOLF.
JOHN G. DUNVILLE.